United States Patent
Shi

(10) Patent No.: US 12,079,258 B2
(45) Date of Patent: Sep. 3, 2024

(54) SIMILARITY PROCESSING METHOD, APPARATUS, SERVER AND STORAGE MEDIUM

(71) Applicant: BAIDU ONLINE NETWORK TECHNOLOGY (BEIJING) CO., LTD., Haidian District (CN)

(72) Inventor: Bin Shi, Beijing (CN)

(73) Assignee: Baidu Online Network Technology (Beijing) Co., Ltd.

( * ) Notice: Subject to any disclaimer, the term of this patent is extended or adjusted under 35 U.S.C. 154(b) by 743 days.

(21) Appl. No.: 17/208,723

(22) Filed: Mar. 22, 2021

(65) Prior Publication Data

US 2021/0224620 A1 Jul. 22, 2021

(30) Foreign Application Priority Data

Jun. 27, 2020 (CN) .......................... 202010593652.6

(51) Int. Cl.
| | |
|---|---|
| G06K 9/00 | (2022.01) |
| G06F 16/33 | (2019.01) |
| G06F 18/22 | (2023.01) |
| G06F 40/279 | (2020.01) |
| G06V 30/196 | (2022.01) |

(52) U.S. Cl.
CPC .......... *G06F 16/3343* (2019.01); *G06F 18/22* (2023.01); *G06F 40/279* (2020.01); *G06V 30/1983* (2022.01)

(58) Field of Classification Search
CPC .... G06F 16/3343; G06F 40/279; G06F 18/22; G06V 30/1983
See application file for complete search history.

(56) References Cited

FOREIGN PATENT DOCUMENTS

| | | |
|---|---|---|
| CN | 106815179 A | 6/2017 |
| CN | 108009253 A | 5/2018 |
| CN | 111209447 A | 5/2020 |
| JP | H08221246 A | 8/1996 |
| JP | H11328317 A | 11/1999 |
| JP | 2007079730 A | 3/2007 |
| JP | 2010044597 A | 2/2010 |
| JP | 2011076384 A | 4/2011 |

(Continued)

OTHER PUBLICATIONS

Li, Min, et al. "Dimsim: An accurate chinese phonetic similarity algorithm based on learned high dimensional encoding." Proceedings of the 22nd Conference on Computational Natural Language Learning. 2018. (Year: 2018).*

(Continued)

*Primary Examiner* — Avinash Yentrapati
(74) *Attorney, Agent, or Firm* — Banner & Witcoff, Ltd.

(57) ABSTRACT

The present application discloses a similarity processing method, an apparatus, a server and a storage medium, and relates to the fields of information processing and natural language processing. The specific implementation solution is as follows: acquiring a first character string and a second character string; determining a pronunciation pattern similarity and a character pattern similarity between the first character string and the second character string; and determining a comprehensive similarity between the first character string and the second character string, based on the pronunciation pattern similarity and the character pattern similarity.

13 Claims, 3 Drawing Sheets

(56) References Cited

FOREIGN PATENT DOCUMENTS

| JP | 2018077850 A | 5/2018 |
|----|--------------|--------|
| JP | 2018190339 A | 11/2018 |

OTHER PUBLICATIONS

Bisandu, Desmond Bala, Rajesh Prasad, and Musa Muhammad Liman. "Data clustering using efficient similarity measures." Journal of Statistics and Management Systems 22.5 (2019): 901-922. (Year: 2019).*
Japanese Patent Office; Japanese Office Action; Japanese Application No. 2021-096303; Jun. 13, 2022; 8 pages.
Chen et al., "Chinese character similarity comparison algorithm based on phonetic code and shape code," Kunming University of Science and Technology?School of Information Engineering and Automation?Kunming, (Nov. 2018). pp. 1-3.
Aug. 24, 2023—(CN) First Office Action w/translation.
Aug. 18, 2023—(CN) First Search Report w/translation.
European Search Report for Application No. 21163985.1, European Patent Office, Apr. 16, 2021, 9 pages.
Bo Peng et al., "A New Phonetic Candidate Generator for Improving Search Query Efficiency," Microsoft Research Asia, Beijing, China and College of Software, Nankai University, Tianjin, China, Interspeech 2011, 4 pages.

* cited by examiner

SIMILARITY PROCESSING METHOD, APPARATUS, SERVER AND STORAGE MEDIUM

CROSS-REFERENCE TO RELATED APPLICATION

This application claims priority to Chinese patent application No. 202010593652.6, filed on Jun. 27, 2020, which is hereby incorporated by reference in its entirety.

TECHNICAL FIELD

The present application relates to the field of computer technology, and specifically relates to the fields of data processing and natural language processing.

BACKGROUND

In the related art, a similarity between character strings may be determined based on an edit distance algorithm, which is a distance measurement method proposed for character strings. A commonly used edit distance algorithm represents the minimum number of times of editing required to convert a character string to another character string; that is, inserting a character into a character string, deleting a character from a character string, or replacing a character in a character string with another character.

SUMMARY

In order to solve one or more of the above problems, the present application proposes a similarity processing method, an apparatus, and a storage medium.

According to an aspect of the application, there is provided a similarity processing method, which may include:
  acquiring a first character string and a second character string;
  determining a pronunciation pattern similarity and a character pattern similarity between the first character string and the second character string; and
  determining a comprehensive similarity between the first character string and the second character string, based on the pronunciation pattern similarity and the character pattern similarity.

According to another aspect of the application, there is provided a similarity processing apparatus, which may include:
  an acquisition module configured for acquiring a first character string and a second character string;
  a first determination module configured for determining a pronunciation pattern similarity and a character pattern similarity between the first character string and the second character string; and
  a second determination module configured for determining a comprehensive similarity between the first character string and the second character string, based on the pronunciation pattern similarity and the character pattern similarity.

According to another aspect of the present application, there is provided an electronic device, which may include:
  at least one processor; and
  a memory communicatively connected with the at least one processor; wherein,
  the memory stores instructions executable by the at least one processor, the instructions being executed by the at least one processor to enable the at least one processor to execute the method as previously described.

According to another aspect of the present application, there is provided a non-transitory computer readable storage medium storing computer instructions, wherein the computer instructions cause a computer to perform the method as previously described.

Other effects achieved by the above-mentioned alternative ways will be explained below with reference to specific embodiments.

It should be understood that the content described in this section is intended neither to identify the key or important features of the embodiments of the present application, nor to limit the scope of the present application. Other features of the present application will be easily understood from the following description.

BRIEF DESCRIPTION OF THE DRAWINGS

The drawings are provided for better understanding of the present application, rather than limiting the present application. In which.

DETAILED DESCRIPTION

Exemplary embodiments of the present application are described below in combination with the accompanying drawings, including various details of the embodiments of the present application to facilitate the understanding, and they should be considered as merely exemplary. Thus, it should be realized by those of ordinary skill in the art that various changes and modifications can be made to the embodiments described here without departing from the scope and spirit of the present application. Also, for the sake of clarity and conciseness, the contents of well-known functions and structures are omitted in the following description.

In the related art, a similarity between character strings may be determined based on an edit distance algorithm, which is a distance measurement method proposed for character strings. A commonly used edit distance algorithm represents the minimum number of times of editing required to convert a character string to another character string; that is, inserting a character into a character string, deleting a character from a character string, or replacing a character in a character string with another character. However, in a case where there are Chinese characters in a character string, how to accurately determine the similarity between sentences composed of Chinese or Chinese characters has become a problem to be solved.

Figure 1:
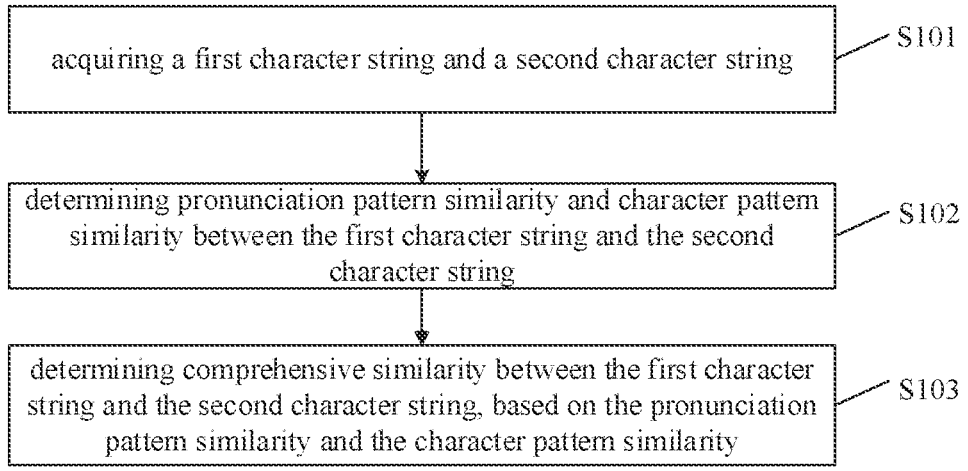
FIG. 1 is a first flowchart of a similarity processing method according to an embodiment of the present application.

The present application provides a similarity processing method. As shown in FIG. 1, the similarity processing method may include:

S101: acquiring a first character string and a second character string;

S102: determining a pronunciation pattern similarity and a character pattern similarity between the first character string and the second character string; and S103: determining a comprehensive similarity between the first character string and the second character string, based on the pronunciation pattern similarity and the character pattern similarity.

Through the above scheme, the similarity between the first character string and the second character string can be determined and acquired from a plurality of dimensions, that is, the similarity between the first character string and the second character string is determined from a plurality of dimensions of pronunciation pattern and character pattern of the first character string and the second character string. Thus, the accuracy of determining the similarity between the first character string and the second character string can be greatly improved.

The similarity processing method provided in the embodiment of the present application may be applied to an electronic device. Here, the electronic device may include a mobile terminal, a stationary terminal or a server; for example, the electronic device may be a mobile phone, a computer, a server or the like.

In S101, the first character string and the second character string may be text information in any similarity scenario. For example, the similarity scenario may be searching for articles with similar titles; for another example, the similarity scenario may be similar spot news on various social platforms; and for further example, the similarity scenario may be classifications of commodities on a shopping platform; and for further example, the similarity scenario may be classifications of books in the library, and the like.

In S101, the contents contained in the first character string and the second character string may include the following cases:

In one case, the first character string contains N Chinese characters, and the second character string contains M Chinese characters, wherein, N and M each are an integer greater than or equal to 1. Herein, N and M may be equal or may not be equal.

In another case, the first character string contains N Chinese characters, and the second character string contains M Chinese characters, wherein, N and M each are an integer greater than or equal to 1. And, the first character string further contains L characters, and the second character string further contains K characters, wherein, L and K are integers, and the character may include at least one of a letter, a number and a symbol.

Wherein, L and K may be equal or may not be equal. In addition, one of L and K may be 0.

In this case, Chinese characters and characters contained in the character string may be interlaced, such as "苹果 123 和大象 ab".

In the embodiment of the present application, the similarity between the first character string and the second character string can be determined and acquired from a plurality of dimensions, that is, the similarity between the first character string and the second character string is determined from a plurality of dimensions of characters, pronunciation pattern and character pattern of the first character string and the second character string. Thus, the accuracy of determining the similarity between the first character string and the second character string can be greatly improved.

In addition, in a case where the first character string and the second character string are Chinese character texts containing Chinese characters, determination of the similarity of the texts containing the Chinese characters can be realized, so that the similarity can be determined based on more comprehensive characters, and thus the accuracy of calculation of the similarity of the texts can be further improved.

In the above-mentioned S102, the method may further include determining a character similarity between the first character string and the second character string based on the first character string and the second character string. Specifically, the method may include:

determining a first edit distance between characters at respective corresponding positions of the first character string and the second character string according to a preset edit distance rule, and determining the character similarity based on the first edit distance.

Here, the edit distance rule can reflect the number of times of edit operations between the character strings. Herein, the edit operations may include an inserting operation, a deleting operation, or a replacing operation. Here, the edit distance rule may be an edit distance formula, or may be an edit distance model or the like.

Here, the characters at respective corresponding positions of the first character string and the second character string mean that bit locations or serial numbers of the first character string and the second character string where the characters are located are the same. For example, in a case where the first character string is "苹果 xgh", the second character string is "水果 kij".

Assuming that the first character string is a and the second string is b, the edit distance formula of the first character string and the second character string is:

$$d(i,j)=d(i-1,j-1), a[i]=b[j];$$

$$d(i,j)=\min(d(i,j-1),d(i-1,j),d(i-1,j-1)), a[i]\neq b[j];$$

wherein, i represents the i-th character in the first character string a, j represents the j-th character in the second character string b; min( ) represents a function taking a minimum value; a[i]=b[j] represents that the length of the first character string is equal to that of the second character string; a[i]≠b[j] represents that the length of the first character string is different from that of the second character string.

Here, the edit distance formula represents the minimum number of times of edit operations between two character strings.

The first edit distance of the first character string and the second character string is obtained as below:

$$D1(a,b)=d(len(a),len(b)).$$

wherein, len(a) represents the length of the first character string, and len (b) represents the length of the second character string.

Based on the first edit distance D1(a,b) the character similarity is obtained as below:

$$Sc(a, b) = 1 - \frac{D1(a, b)}{\text{Max}(\text{len}(a), \text{len}(b))};$$

wherein, max( ) represents a function taking a maximum value.

Here, the first edit distance between the characters at respective corresponding positions of the first character string and the second character string is:

$$d(0, 0) = 0;$$
$$d(i, 0) = i;$$
$$d(0, j) = j;$$
$$d(i, j) = \begin{cases} d(i-1, j-1) & a_i = b_j \\ \min\begin{cases} d(i-1, j-i) \\ d(i, j-1) \\ d(i-1, j-1) \end{cases} & a_i \neq b_j \end{cases};$$

wherein, d(i−1, j−1) represents the number of times the editing from a(0, i−1) to b(0, j−i) is completed. For example, in a case where a(0, i−1)=b(0, j−1), d(i, j) represents an editing in which a(i) is replaced by b(j); here, d(i−1, j−1) corresponds to performing a replacement operation that replaces b[i] with b[j] one time.

Wherein, d(i−1, j) represents the number of times the editing from a(0, i−1) to b(0, j) is completed. For example, in a case where a(0, i−1)=b(0, j), d(i, j) represents an editing in which a(i) is deleted; here, d(i−1, j) corresponds to performing a deletion operation in which a(i) is deleted one time.

Wherein, d(i, j−1) represents the number of times the editing from a(0, i) to b(0, j−1) is completed. For example, in a case where a(0, i)=b(0, j−1), (i, j) represents that the editing can be completed just by inserting b(j) into the location of a(i); here, d(i, j−1) corresponds to performing an insertion operation of inserting b(j) into a(i) one time.

In an example, the first edit distance D(a, b) between the first character string and the second character string is the sum of characters d(i, j) at respective corresponding positions of the first character string and the second character string.

Here, the first edit distance is inversely related to the character similarity. The smaller the first edit distance is, the greater the character similarity is, and the higher the similarity between the first character string and the second character string is. The larger the first edit distance is, the smaller the character similarity is, and the lower the similarity between the first character string and the second character string is.

In this embodiment, the character similarity between the first character string and the second character string including characters can be determined. Specifically, the first edit distance of the characters may be calculated based on a predetermined edit distance formula, and the character similarity may be determined based on the first edit distance.

Of course, the edit distance formula for calculating the character similarity may be any other formula that can reflect the number of times of edit operations between two character strings, and is not limited here.

Figure 2:
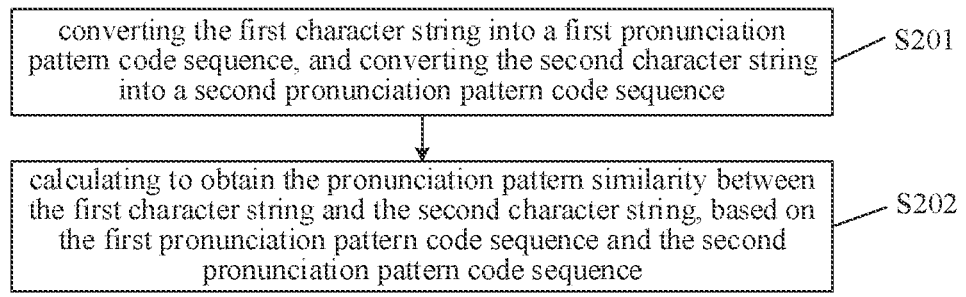
FIG. 2 is a schematic flowchart of determining a pronunciation pattern similarity according to an embodiment of the present application.

As shown in FIG. 2, in the foregoing S102, the determining the pronunciation pattern similarity between the first character string and the second character string, may include:

S201: converting the first character string into a first pronunciation pattern code sequence, and converting the second character string into a second pronunciation pattern code sequence; and S202: calculating to obtain the pronunciation pattern similarity between the first character string and the second character string, based on the first pronunciation pattern code sequence and the second pronunciation pattern code sequence.

In the foregoing description of S101, it has been pointed out that there may be two cases for the character strings, and S201 and S202 will be described through two examples in conjunction with the two cases for S101:

Example 1: the first character string contains N Chinese characters, and the second character string contains M Chinese characters, wherein, N and M each are an integer greater than or equal to 1.

In S201, the converting the first character string into the first pronunciation pattern code sequence, and the converting the second character string into the second pronunciation pattern code sequence, may include:

determining N sets of Chinese phonetic alphabets and tones corresponding to the N Chinese characters in the first character string, and determining the first pronunciation pattern code sequence based on the N sets of Chinese phonetic alphabets and tones; and determining M sets of Chinese phonetic alphabets and tones corresponding to the M Chinese characters in the second character string, and determining the second pronunciation pattern code sequence based on the M sets of Chinese phonetic alphabets and tones.

For example, the first character string is "苹果", which may be converted into a first pronunciation pattern code sequence of "ping2guo3", and the second character string is "夏天", which may be converted into a second pronunciation pattern code sequence of "xia4tian1". Here, both the first and second pronunciation pattern codes are a combination of Chinese phonetic alphabets plus tones, wherein "1", "2", "3" and "4" are character strings corresponding to first, second, third and fourth tones, respectively.

Alternatively, the first pronunciation pattern code sequence may only include Chinese phonetic alphabets, and the second pronunciation pattern code sequence may only include Chinese phonetic alphabets. For example, the first character string is "苹果", which may be converted into a first pronunciation pattern code sequence of "pingguo", and the second character string is "夏天", which may be converted into a second pronunciation pattern code sequence of "xiatian".

S202 may include: determining a second edit distance between pronunciation pattern codes at respective corresponding positions of the first pronunciation pattern code sequence and the second pronunciation pattern code sequence according to a preset edit distance rule, and determining the pronunciation pattern similarity based on the second edit distance.

Here, the edit distance rule is similar to the above calculation way of the character similarity, and the corresponding second edit distance formula may be D2(a, b)=d (len (a),len (b)).

Here, based on the second edit distance, the pronunciation pattern similarity may be determined as below:

$$Sp(a, b) = 1 - \frac{D2(Pa, Pb)}{\text{Max}(\text{len}(Pa), \text{len}(Pb))}.$$

Here, Pa represents a first pronunciation pattern code sequence, Pb represents a second pronunciation pattern code sequence, Sp represents a pronunciation pattern similarity, and a and b represent a first character string and a second character string, respectively. The definitions of other equations in the formula are the same as those mentioned above, and are not repeated here.

In addition, the second edit distance is inversely related to the pronunciation pattern similarity. The smaller the second edit distance is, the greater the pronunciation pattern similarity is, and the higher the similarity between the first character string and the second character string is. The larger the second edit distance is, the smaller the pronunciation pattern similarity is, and the lower the similarity between the first character string and the second character string is.

In this embodiment, the Chinese characters in the first character string and the second character string can be analyzed from the perspective of pronunciation pattern, so that the similarity between the first character string and the second character string can be more comprehensively analyzed. And, in a case of analyzing from the perspective of pronunciation pattern, the tone factor is added in Chinese phonetic alphabets, so that the similarity between pronunciations is considered. Thus, in this embodiment, the similarity between the first character string and the second character string can be reflected more accurately and comprehensively, and the accuracy of determining the similarity between the texts can be further improved.

Of course, the edit distance formula for calculating the pronunciation pattern similarity may be any other formula that can reflect the number of times of edit operations between two pronunciation pattern codes, and is not limited here.

Example 2: the first character string contains N Chinese characters, and the second character string contains M Chinese characters, wherein, N and M each are an integer greater than or equal to 1; and the first character string further contains L characters, and the second character string further contains K characters, wherein, L and K are integers, and the character may include at least one of a letter, a number and a symbol.

In S201, the method may further include: determining the first pronunciation pattern code sequence based on the N sets of Chinese phonetic alphabets and tones corresponding to the N Chinese characters as well as the L characters; and determining the second pronunciation pattern code sequence based on the M sets of Chinese phonetic alphabets and tones corresponding to the M Chinese characters as well as the K characters.

That is, on the basis that the Chinese phonetic alphabets and tones corresponding to the Chinese characters in the character string are obtained in the Example 1, the Chinese phonetic alphabets and tones corresponding to the Chinese characters are spliced with the characters in the character string, to obtain the pronunciation pattern code sequence.

In a case where the first character string and the second character string each include Chinese characters and characters, and in a case where the Chinese characters of the first character string are converted into a first pronunciation pattern code sequence and in a case where the second character string is converted into a second pronunciation pattern code sequence, N sets of Chinese phonetic alphabets and tones as well as L characters in the first character string may be spliced into the first pronunciation pattern code sequence, and M sets of Chinese phonetic alphabets and tones as well as K characters in the second character string may be spliced into the second pronunciation pattern code sequence.

For example, in a case where the first character string is "app 相似", and the second character is "apple 相思", the first pronunciation pattern code converted from the first character string may be "appxiang1si4", wherein the character string "app" in the first character string is spliced with the pronunciation pattern code "xiang1si4" converted from the Chinese characters in the first character string; and the second pronunciation pattern code converted from the second character string may be "applexiang1si1", wherein the character string "apple" in the second character string is spliced with the pronunciation pattern code "xiang1si1" converted from the Chinese characters in the second character string.

The processing of S202 in this example is the same as that of the foregoing Example 1, and is not repeated again.

Thus, in this embodiment, the character strings in the text and the pronunciation pattern codes converted from the Chinese characters may be splice firstly, and then only the pronunciation pattern similarity and the character pattern similarity between the texts are obtained, so that the similarity can be obtained with relatively few dimensions, while improving the accuracy of determining the similarity between the texts, and the computational complexity is reduced.

Figure 3:
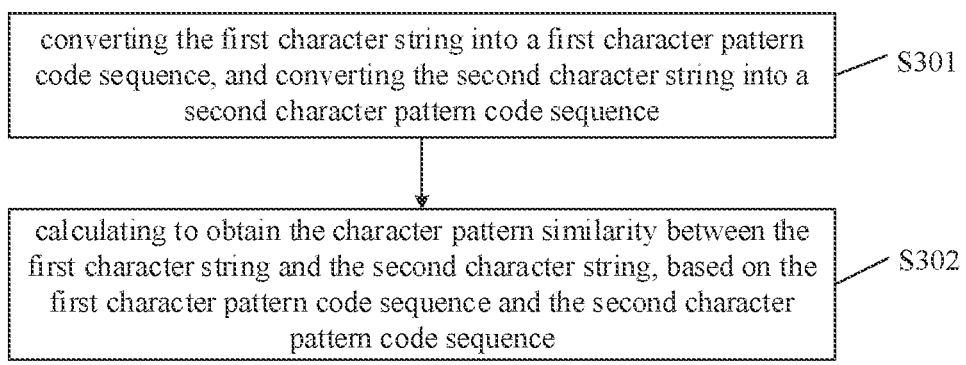
FIG. 3 is a schematic flowchart of determining character pattern similarity according to an embodiment of the present application.

As shown in FIG. 3, in the foregoing S102, the determining the character pattern similarity between the first character string and the second character string, may include:

S301: converting the first character string into a first character pattern code sequence, and converting the second character string into a second character pattern code sequence; and S302: calculating to obtain the character pattern similarity between the first character string and the second character string, based on the first character pattern code sequence and the second character pattern code sequence.

Similarly, in the foregoing description of S101, it has been pointed out that there may be two cases for the character strings, and S301 and S302 will be described through two examples in conjunction with the two cases for S101:

Example 3: the first character string contains N Chinese characters, and the second character string contains M Chinese characters, wherein, N and M each are an integer greater than or equal to 1.

In S301: the converting the first character string into a first character pattern code sequence, and the converting the second character string into a second character pattern code sequence, may include:

determining N sets of character pattern codes corresponding to the N Chinese characters in the first character string, and determining the first character pattern code sequence based on the N sets of character pattern codes; and determining M sets of character pattern codes corresponding to the M Chinese characters in the second character string, and determining the second character pattern code sequence based on the M sets of character pattern codes.

Here, the character pattern codes may include WuBi encodes or strokes.

In other examples, of course, the first character code and the second character code may also be any other character code that represent a character pattern, for example, the first character code and the second character code may be character codes that include Chinese character components, such as radicals and so on.

Here, a mapping relationship between a character pattern code and encoding may be established in advance. For example, a mapping relationship between a stroke and a character is established, e.g., encoding corresponding to a horizontal stroke may be "a", and encoding corresponding to a vertical stroke may be "b". For another example, a mapping relationship between the WuBi and encoding is established, wherein the mapping relationship between the WuBi and the encoding may be determined based on a WuBi root table, or the mapping relationship between the WuBi and the encoding may be defined by a user. For example, the Chinese characters "你好" in a text may be converted into the character pattern code "wqiyvbg".

The above S302 may specifically include: determining a third edit distance between character pattern codes at respective corresponding positions of the first character pattern code and the second character pattern code according to a preset edit distance rule; and determining a character pattern similarity based on the third edit distance.

Here, the edit distance rule is similar to the above, and the corresponding third edit distance formula may be $D3(a,b)=d(len(a),len(b))$.

Here, based on the third edit distance, the character pattern similarity may be determined as below:

$$Sw(a, b) = 1 - \frac{D3(Wa, Wb)}{\text{Max}(\text{len}(Wa), \text{len}(Wb))}.$$

Here, Wa is a first pronunciation pattern code sequence, Wb is a second pronunciation pattern code sequence, Sw represents a pronunciation pattern similarity, and a and b represent a first character string and a second character string, respectively. The definitions of other equations in the formula are the same as those mentioned above, and are not repeated here.

Here, the third edit distance is inversely related to the character pattern similarity. The smaller the third edit distance is, the greater the character pattern similarity is, and the higher the similarity between the first character string and the second character string is. The larger the third edit distance is, the smaller the character pattern similarity is, and the lower the similarity between the first character string and the second character string is.

In this embodiment, the Chinese characters in the first character string and the second character string can be analyzed from the perspective of character pattern, so that the similarity between the first character string and the second character string can be more comprehensively analyzed, and thus the accuracy of determining the similarity between the texts can be further improved.

Of course, the edit distance formula for calculating the character pattern similarity may be any other formula that can reflect the number of times of edit operations between two character pattern codes, and is not limited here.

Example 4: the first character string contains N Chinese characters, and the second character string contains M Chinese characters, wherein N and M each are an integer greater than or equal to 1; and the first character string further contains L characters, and the second character string further contains K characters, wherein L and K are integers, and the character may include at least one of a letter, a number and a symbol.

In S301, the method may further include: determining the first character pattern code sequence based on the N sets of character pattern codes corresponding to the N Chinese characters as well as the L characters in the first character string; and determining the second character pattern code sequence based on the M sets of character pattern codes corresponding to the M Chinese characters as well as the K characters in the second character string.

That is, on the basis that the Chinese phonetic alphabets and tones corresponding to the Chinese characters in the character string are obtained in the Example 3, the Chinese phonetic alphabets and tones corresponding to the Chinese characters are spliced with the characters in the character string, to obtain the pronunciation pattern code sequence.

The processing of S302 in this example is the same as that of the foregoing Example 3, and is not repeated here again.

In this example, the Chinese characters in the first character string and the second character string may be converted into corresponding character pattern codes firstly, and L characters or K characters in the first character string and the second character string are spliced with the corresponding character pattern codes, so that other character similarities can be considered while determining the character pattern similarity of the Chinese characters.

Based on the foregoing processing, the above S103 in this embodiment may include: determining the comprehensive similarity based on a sum of products of the pronunciation pattern similarity and the character pattern similarity with respective weight coefficients.

Further, the method may further include: determining the comprehensive similarity based on a sum of products of the character pattern similarity, the pronunciation pattern similarity and the character pattern similarity with respective weight coefficients.

In an example, the method may further include:
determining a first weight coefficient of the character similarity, determining a second weight coefficient of the pronunciation pattern similarity, and determining a third weight coefficient of the character pattern similarity.

Accordingly, in a case where S103 is executed, the method may include:
determining a first numerical value based on the character similarity and the first weight coefficient, determining a second numerical value based on the pronunciation pattern similarity and the second weight coefficient, and determining a third numerical value based on the character pattern similarity and the third weight coefficient; and
determining the comprehensive similarity based on the first numerical value, the second numerical value, and the third numerical value.

The first weight coefficient, the second weight coefficient and the third weight coefficient each are greater than or equal to 0, and are smaller than or equal to 1.

Here, the first weight coefficient, the second weight coefficient and the third weight coefficient may be determined according to actual conditions. In a scenario, for example, the degree of importance of the character similarity is greater than the degree of importance of the pronunciation pattern similarity, and the degree of importance of the pronunciation pattern similarity is greater than the degree of importance of the character pattern similarity, then it is determined that the first weight coefficient is greater than the second weight coefficient, and the second weight coefficient is greater than the third weight coefficient. For another example, in another scenario, the value of the second weight coefficient or the third weight coefficient is equal to 0.

For example, in a case where the first weight coefficient is 0.5, the second weight coefficient is 0.3, and the third weight coefficient is 0.2, the comprehensive similarity may be:

$S(a,b)=0.5$ Sc+0.3 Sp+0.2 Sw; wherein, Sc represents a character similarity, Sp represents a pronunciation pattern similarity, and Sw represents a character pattern similarity.

In this embodiment, the weight coefficients of the character similarity, the pronunciation pattern similarity and the character pattern similarity can be determined, and the comprehensive similarity is determined based on the character similarity, the pronunciation pattern similarity and the character pattern similarity together with their respective weight coefficients. In this way, this embodiment takes into account the actual situation of the degree of importance of the character similarity, the pronunciation pattern similarity and the character pattern similarity in each scenario, thus the accuracy of determining the similarity between the first character string and the second character string can be further improved.

Figure 4:
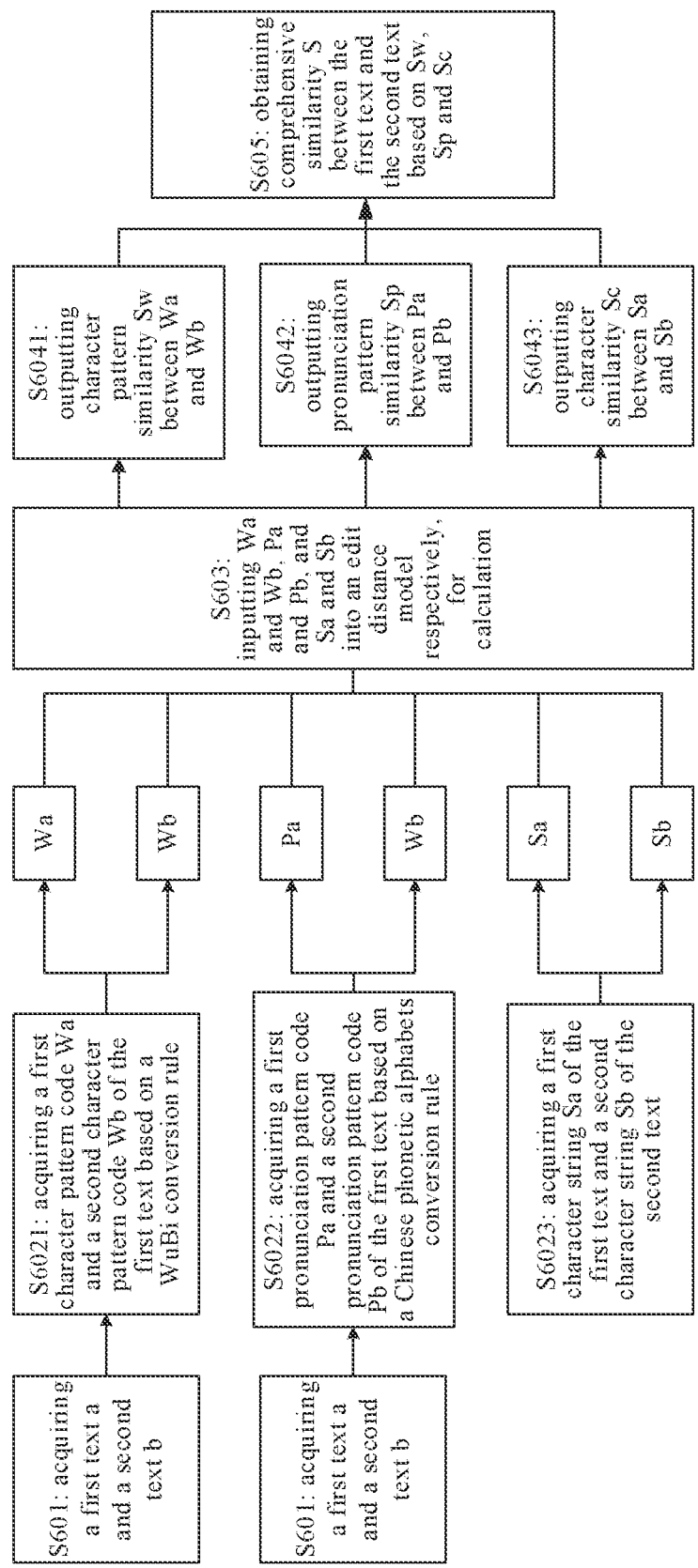
FIG. 4 is a second flowchart of a similarity processing method according to an embodiment of the present application.

An exemplary embodiment of the present invention is described below with reference to FIG. 4.

S601: acquiring a first character string a and a second character string b;

S6021: acquiring a first character pattern code Wa and a second character pattern code Wb of the first character string based on a WuBi conversion rule;

S6022: acquiring a first pronunciation pattern code Pa and a second pronunciation pattern code Pb of the first character string based on a Chinese phonetic alphabets conversion rule;

S6023: acquiring a first character string Sa of the first character string and a second character string Sb of the second character string;

S603: inputting Wa and Wb, Pa and Pb, as well as Sa and Sb into an edit distance model respectively, for calculation;

S6041: outputting the character pattern similarity Sw between Wa and Wb;

S6042: outputting the pronunciation pattern similarity Sp between Pa and Pb;

S6043: outputting the character similarity Sc between Sa and Sb; and

S605: obtaining the comprehensive similarity S between the first character string and the second character string based on Sw, Sp and Sc.

In the embodiment of the present application, the similarity between the first character string and the second character string can be determined and acquired from a plurality of dimensions, that is, the similarity between the first character string and the second character string is determined from a plurality of dimensions of characters, pronunciation pattern and character pattern of the first character string and the second character string. Thus, the accuracy of determining the similarity between the first character string and the second character string can be greatly improved.

Determination of the similarity of the texts containing the Chinese characters can be realized from the perspectives of pronunciation pattern and character pattern, so that the similarity can be determined based on more comprehensive characters, and thus the accuracy of calculation of the similarity of the texts can be further improved.

Figure 5:
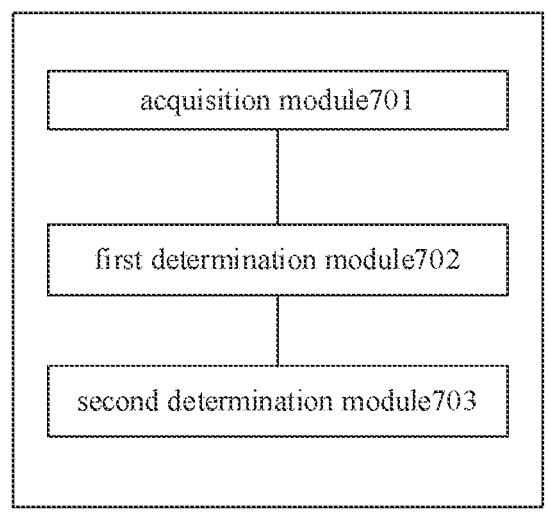
FIG. 5 is a schematic structural diagram of a similarity processing apparatus according to an embodiment of the present application.

The present application provides a text similarity apparatus. As shown in FIG. 5, the text similarity apparatus may include:

an acquisition module 701 configured for acquiring a first character string and a second character string;

a first determination module 702 configured for determining a pronunciation pattern similarity and a character pattern similarity between the first character string and the second character string; and a second determination module 703 configured for determining a comprehensive similarity between the first character string and the second character string, based on the pronunciation pattern similarity and the character pattern similarity.

Herein, the first determination module 702 may be configured for converting the first character string into a first pronunciation pattern code sequence, and converting the second character string into a second pronunciation pattern code sequence; calculating to obtain the pronunciation pattern similarity between the first character string and the second character string, based on the first pronunciation pattern code sequence and the second pronunciation pattern code sequence.

The first determination module 702 may be configured for converting the first character string into a first character pattern code sequence, and converting the second character string into a second character pattern code sequence; and calculating to obtain the character pattern similarity between the first character string and the second character string, based on the first character pattern code sequence and the second character pattern code sequence.

The first character string may contain N Chinese characters, and the second character string may contain M Chinese characters, wherein. N and M each are an integer greater than or equal to 1.

The first determination module 702 may be configured for determining N sets of Chinese phonetic alphabets and tones corresponding to the N Chinese characters in the first character string, and determining the first pronunciation pattern code sequence based on the N sets of Chinese phonetic alphabets and tones; and determining M sets of Chinese phonetic alphabets and tones corresponding to the M Chinese characters in the second character string, and determining the second pronunciation pattern code sequence based on the M sets of Chinese phonetic alphabets and tones.

The first determination module 702 may be configured for determining N sets of character pattern codes corresponding to the N Chinese characters in the first character string, and determining the first character pattern code sequence based on the N sets of character pattern codes; and determining M sets of character pattern codes corresponding to the M Chinese characters in the second character string, and determining the second character pattern code sequence based on the M sets of character pattern codes.

The first character string may further contain L characters, the second character string may further contain K characters, wherein. L and K are integers, and the character comprises at least one of a letter, a number and a symbol.

The first determination module 702 may be configured for determining the first pronunciation pattern code sequence based on the N sets of Chinese phonetic alphabets and tones corresponding to the N Chinese characters as well as the L characters; and determining the second pronunciation pattern code sequence based on the M sets of Chinese phonetic alphabets and tones corresponding to the M Chinese characters as well as the K characters.

The first determination module 702 may be configured for determining the first character pattern code sequence based on the N sets of character pattern codes corresponding to the N Chinese characters as well as the L characters in the first character string; and determining the second character pattern code sequence based on the M sets of character pattern codes corresponding to the M Chinese characters as well as the K characters in the second character string.

The second determination module 703 may be configured for determining the comprehensive similarity between the first character string and the second character string, based on a sum of products of the character pattern similarity, the pronunciation pattern similarity and the character pattern similarity with respective weight coefficients.

It can be seen that by adopting the above scheme, the similarity between the first character string and the second character string can be determined and acquired from a plurality of dimensions, that is, the similarity between the first character string and the second character string is determined from a plurality of dimensions of characters, pronunciation pattern and character pattern of the first character string and the second character string. Thus, the accuracy of determining the similarity between the first character string and the second character string can be greatly improved.

And, in a case where the first character string and the second character string are Chinese character texts containing Chinese characters, the determination of the similarity of the texts containing the Chinese characters can be realized from the perspectives of pronunciation pattern and character pattern, so that the similarity can be determined based on more comprehensive characters, and thus the accuracy of calculation of the similarity of the texts can be further improved.

In addition, this embodiment takes into account the actual situation of the degree of importance of the character similarity, the pronunciation pattern similarity and the character pattern similarity in each scenario, thus the accuracy of determining the similarity between the first character string and the second character string can be further improved.

The functions of respective modules of each apparatuses according to the embodiments of the present application may refer to the corresponding descriptions in the above methods, and are not repeated here.

According to an embodiment of the present application, the present application also provides an electronic device and a readable storage medium. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the application described and/or claimed herein.

Figure 6:
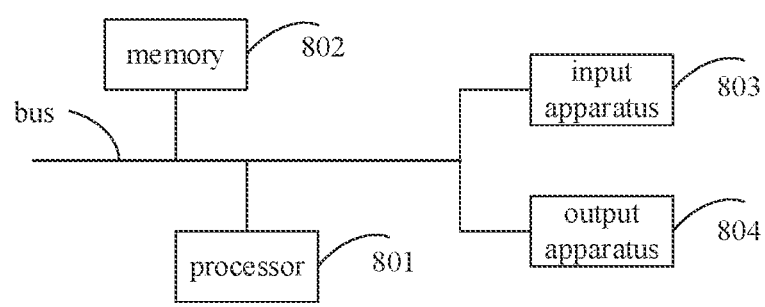
FIG. 6 is a block diagram of an electronic device for implementing a similarity processing apparatus according to an embodiment of the present application.

The text similarity apparatus may be implemented by an electronic device. As shown in FIG. 6, the electronic device may include one or more processors 801, a memory 802, and interfaces for connecting the respective components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of a processor 801 is shown in FIG. 6.

The memory 802 is a non-transitory computer-readable storage medium provided herein. The memory stores instructions executable by at least one processor to cause the at least one processor to perform the method provided herein. The non-transitory computer-readable storage medium of the present application stores computer instructions for causing a computer to perform the method provided herein.

The memory 802, as a non-transitory computer-readable storage medium, may be configured to store non-transitory software programs, non-transitory computer executable programs and modules, such as program instructions/modules corresponding to the method in the embodiments of the present application (such as the acquisition module, the first determination module and the second determination module shown in FIG. 5). The processor 801 executes various functional applications and data processing of the electronic device by running the non-transitory software programs, instructions and modules stored in the memory 802, that is, implements the method in the above method embodiments.

The memory 802 may include a program storage area and a data storage area, wherein the program storage area may store an operating system, and an application program required for at least one function; and the data storage area may store data created according to the use of the electronic device, etc. In addition, the memory 802 may include a high speed random access memory, and may also include a non-transitory memory, such as at least one disk storage device, a flash memory device, or other non-transitory solid state storage devices. In some embodiments, the memory 802 may optionally include a memory remotely located with respect to the processor 801, which may be connected, via a network, to the electronic device. Examples of such networks may include, but are not limited to, the Internet, an intranet, a local area network, a mobile communication network and combinations thereof.

The apparatus for implementing the text similarity method, or the electronic device, may further include an input device 803 and an output device 804. The processor 801, the memory 802, the input device 803, and the output device 804 may be connected by a bus or other means, exemplified by a bus connection in FIG. 6.

The input device 803 may receive input numeric or character information, and generate a key signal input related to a user setting and a functional control of an electronic device. For example, the input device may be a touch screen, a keypad, a mouse, a track pad, a touch pad, a pointer stick, one or more mouse buttons, a track ball, a joystick, and other input devices. The output device 804 may include a display device, an auxiliary lighting device (e.g., a light emitting diode (LED)), a tactile feedback device (e.g., a vibrating motor), etc. The display device may include, but is not limited to, a liquid crystal display (LCD), an LED display, and a plasma display. In some embodiments, the display device may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor, the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e.g., a cathode ray tube (CRT) or a liquid crystal display (LCD) monitor) for displaying information to the user; and a keyboard and a pointing device (e.g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other.

According to the technical solution of the embodiment of the present application, the similarity between the first character string and the second character string can be determined and acquired from a plurality of dimensions, that is, the similarity between the first character string and the second character string is determined from a plurality of dimensions of characters, pronunciation pattern and character pattern of the first character string and the second character string. Thus, the accuracy of determining the similarity between the first character string and the second character string can be greatly improved.

It should be understood that the steps can be reordered, added or deleted using the various flows illustrated above. For example, the steps described in the present application may be performed concurrently, sequentially or in a different order, so long as the desired results of the technical solutions disclosed in the present application can be achieved, and there is no limitation herein.

The above-described specific embodiments do not limit the scope of the present application. It will be apparent to those skilled in the art that various modifications, combinations, sub-combinations and substitutions are possible, depending on design requirements and other factors. Any modifications, equivalent substitutions, and improvements within the spirit and principles of this application are intended to be included within the scope of this application.

What is claimed is:

1. A similarity processing method, comprising:
    acquiring a first character string and a second character string;
    determining a first edit distance between characters at respective corresponding positions of the first character string and the second character string according to a preset edit distance rule, and determining a character similarity based on the first edit distance and a first weight coefficient of the character similarity;
    converting the first character string into a first pronunciation pattern code sequence and converting the second character string into a second pronunciation pattern code sequence;
    determining a second edit distance between pronunciation pattern codes at respective corresponding positions of the first pronunciation pattern code sequence and the second pronunciation pattern code sequence according to the preset edit distance rule;
    determining a pronunciation pattern similarity based on the second edit distance and a second weight coefficient of the pronunciation pattern similarity;
    converting the first character string into a first character pattern code sequence, and converting the second character string into a second character pattern code sequence;
    determining a third edit distance between character pattern codes at respective corresponding positions of the first character pattern code and the second character pattern code according to the preset edit distance rule;
    determining a character pattern similarity based on the third edit distance and a third weight coefficient of the character pattern similarity;
    determining a first numerical value based on the character similarity and the first weight coefficient, determining a second numerical value based on the pronunciation pattern similarity and the second weight coefficient, and determining a third numerical value based on the character pattern similarity and the third weight coefficient; and
    determining a comprehensive similarity based on the first numerical value, the second numerical value, and the third numerical value, wherein the first weight coefficient, the second weight coefficient and the third weight coefficient each are greater than or equal to 0, and are smaller than or equal to 1.

2. The similarity processing method according to claim 1, wherein, the first character string contains N Chinese characters, and the second character string contains M Chinese characters, wherein, N and M each are an integer greater than or equal to 1;
   the converting the first character string into the first pronunciation pattern code sequence, and the converting the second character string into the second pronunciation pattern code sequence, comprises:
      determining N sets of Chinese phonetic alphabets and tones corresponding to the N Chinese characters in the first character string, and determining the first pronunciation pattern code sequence based on the N sets of Chinese phonetic alphabets and tones, and determining M sets of Chinese phonetic alphabets and tones corresponding to the M Chinese characters in the second character string, and determining the second pronunciation pattern code sequence based on the M sets of Chinese phonetic alphabets and tones.

3. The similarity processing method according to claim 2, wherein, the first character string further contains L characters, and the second character string further contains K characters, wherein, L and K ae integers, and the character comprises at least one of a letter, a number and a symbol:
   the method further comprises:
      determining the first pronunciation pattern code sequence based on the N sets of Chinese phonetic alphabets and tones corresponding to the N Chinese characters as well as the L characters; and
      determining the second pronunciation pattern code sequence based on the M sets of Chinese phonetic alphabets and tones corresponding to the M Chinese characters as well as the K characters.

4. The similarity processing method according to claim 1, wherein, the first character string contains N Chinese characters, and the second character string contains M Chinese characters, wherein, N and M each are an integer greater than or equal to 1;
   the converting the first character string into the first character pattern code sequence, and the converting the second character string into the second character pattern code sequence, comprises:
      determining N sets of character pattern codes corresponding to the N Chinese characters in the first character string, and determining the first character pattern code sequence based on the N sets of character pattern codes; and
      determining M sets of character pattern codes corresponding to the M Chinese characters in the second character string, and determining the second character pattern code sequence based on the M sets of character pattern codes.

5. The similarity processing method according to claim 4, wherein, the first character string further contains L characters, and the second character string further contains K characters, wherein, L and K are integers, and the character comprises at least one of a letter, a number and a symbol;
   the method further comprises:
      determining the first character pattern code sequence based on the N sets of character pattern codes corresponding to the N Chinese characters as well as the L characters in the first character string; and
      determining the second character pattern code sequence based on the M sets of character pattern codes corresponding to the M Chinese characters as well as the K characters in the second character string.

6. A similarity processing apparatus, comprising:
   a processor and a memory for storing one or more computer programs executable by the processor,
   wherein when executing at least one of the computer programs, the processor is configured to perform operations comprising:
      acquiring a first character string and a second character string:
      determining a first edit distance between characters at respective corresponding positions of the first character string and the second character string according to a preset edit distance rule, and determining a character similarity based on the first edit distance and a first weight coefficient of the character similarity;
      converting the first character string into a first pronunciation pattern code sequence and converting the second character string into a second pronunciation pattern code sequence;
      determining a second edit distance between pronunciation pattern codes at respective corresponding positions of the first pronunciation pattern code sequence and the second pronunciation pattern code sequence according to the preset edit distance rule;
      determining a pronunciation pattern similarity based on the second edit distance and a second weight coefficient of the pronunciation pattern similarity;
      converting the first character string into a first character pattern code sequence, and converting the second character string into a second character pattern code sequence;
      determining a third edit distance between character pattern codes at respective corresponding positions of the first character pattern code and the second character pattern code according to the preset edit distance rule;
      determining a character pattern similarity based on the third edit distance and a third weight coefficient of the character pattern similarity;
      determining a first numerical value based on the character similarity and the first weight coefficient, determining a second numerical value based on the pronunciation pattern similarity and the second weight coefficient, and determining a third numerical value based on the character pattern similarity and the third weight coefficient; and
      determining a comprehensive similarity based on the first numerical value, the second numerical value, and the third numerical value, wherein the first weight coefficient, the second weight coefficient and the third weight coefficient each are greater than or equal to 0, and are smaller than or equal to 1.

7. The similarity processing apparatus according to claim 6, wherein, the first character string contains N Chinese characters, and the second character string contains M Chinese characters, wherein, N and M each are an integer greater than or equal to 1;
   when executing at least one of the computer programs, the processor is configured to further perform operations comprising:
      determining N sets of Chinese phonetic alphabets and tones corresponding to the N Chinese characters in the first character string, and determining the first pronunciation pattern code sequence based on the N sets of Chinese phonetic alphabets and tones; and determining M sets of Chinese phonetic alphabets and tones corresponding to the M Chinese characters in the second character string, and determining the second pronunciation pattern code sequence based on the M sets of Chinese phonetic alphabets and tones.

8. The similarity processing apparatus according to claim 7, wherein, the first character string further contains L characters, and the second character string further contains K characters, wherein, L and K are integers, and the character comprises at least one of a letter, a number and a symbol;

when executing at least one of the computer programs, the processor is configured to further perform operations comprising:

determining the first pronunciation pattern code sequence based on the N sets of Chinese phonetic alphabets and tones corresponding to the N Chinese characters as well as the L characters; and determining the second pronunciation pattern code sequence based on the M sets of Chinese phonetic alphabets and tones corresponding to the M Chinese characters as well as the K characters.

9. The similarity processing apparatus according to claim 6, wherein, the first character string contains N Chinese characters, and the second character string contains M Chinese characters, wherein, N and M each are an integer greater than or equal to 1;

when executing at least one of the computer programs, the processor is configured to further perform operations comprising:

determining N sets of character pattern codes corresponding to the N Chinese characters in the first character string, and determining the first character pattern code sequence based on the N sets of character pattern codes; and determining M sets of character pattern codes corresponding to the M Chinese characters in the second character string, and determining the second character pattern code sequence based on the M sets of character pattern codes.

10. The similarity processing apparatus according to claim 9, wherein, the first character string further contains L characters, and the second character string further contains K characters, wherein, L and K are integers, and the character comprises at least one of a letter, a number and a symbol;

when executing at least one of the computer programs, the processor is configured to further perform operations comprising:

determining the first character pattern code sequence based on the N sets of character pattern codes corresponding to the N Chinese characters as well as the L characters in the first character string; and determining the second character pattern code sequence based on the M sets of character pattern codes corresponding to the M Chinese characters as well as the K characters in the second character string.

11. The similarity processing apparatus according to claim 6, wherein, when executing at least one of the computer programs, the processor is configured to further perform operations comprising:

determining the comprehensive similarity between the first character string and the second character string, based on a sum of products of the character pattern similarity, the pronunciation pattern similarity and the character pattern similarity with respective weight coefficients.

12. A non-transitory computer-readable storage medium storing computer instructions, wherein the computer instructions cause a computer to perform the similarity processing method according to claim 1.

13. A non-transitory computer-readable storage medium storing computer instructions, wherein the computer instructions cause a computer to perform the similarity processing method according to claim 2.

* * * * *